US006873431B1

(12) United States Patent
Kohler et al.

(10) Patent No.: US 6,873,431 B1
(45) Date of Patent: Mar. 29, 2005

(54) APPLICATION PROGRAMMING INTERFACE FOR MEASURING DEVICES

(75) Inventors: Timothy L. Kohler, San Jose, CA (US); Todd Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/241,853

(22) Filed: Feb. 2, 1999

(51) Int. Cl.[7] .................................................. G06K 1/00

(52) U.S. Cl. ....................... 358/1.9; 358/1.14; 358/504; 382/167

(58) Field of Search ................................ 358/1.9, 1.14, 358/405, 406, 448, 504, 296, 3.23, 523; 382/167, 162

(56) References Cited

U.S. PATENT DOCUMENTS

| | | | | | |
|---|---|---|---|---|---|
| 5,450,165 | A | * | 9/1995 | Henderson | 399/49 |
| 5,504,928 | A | | 4/1996 | Cook et al. | 395/882 |
| 5,537,516 | A | | 7/1996 | Sherman et al. | 395/109 |
| 5,550,957 | A | | 8/1996 | Davidson, Jr. et al. | 395/114 |
| 5,784,667 | A | * | 7/1998 | Mestha et al. | 399/49 |
| 5,805,777 | A | | 9/1998 | Kuchta | 395/112 |
| 5,819,090 | A | | 10/1998 | Wolf et al. | 395/682 |
| 5,828,781 | A | * | 10/1998 | Nakano | 382/167 |
| 5,956,044 | A | * | 9/1999 | Giorgianni et al. | 345/590 |
| 6,043,894 | A | * | 3/2000 | Van Aken et al. | 356/425 |
| 6,256,111 | B1 | * | 7/2001 | Rijavec | 358/1.9 |
| 6,337,922 | B2 | * | 1/2002 | Kumada | 382/162 |
| 6,404,517 | B1 | * | 6/2002 | Chao | 358/504 |
| 6,611,621 | B2 | * | 8/2003 | Shiraiwa | 382/167 |

OTHER PUBLICATIONS http://en.wikipedia.org/wiki/Application_Programming_ Interface.

* cited by examiner

*Primary Examiner*—Joseph R. Pokrzywa
(74) *Attorney, Agent, or Firm*—Fitzpatrick, Cella, Harper & Scinto

(57) ABSTRACT

An application programming interface (API) that provides a common interface between an application program and plural different types of color measuring devices each having at least one color measuring sensor. The API includes plural functions for operating any of the plural different types of color measuring devices. In order to complete an operation performed by at least one of the plural functions, the function that performs the operation must be called a number of times which is different for at least two different types of color measuring devices. For a particular color measuring device, the API provides the application program with flow control data of the number of times that the function must be called. This flow control data preferably can be provided by the function, in the form of a call-again value or as a numerical value, or by a separate function in the API such as a get-device-capabilities function. In some embodiments of the invention, a combination of these methods of providing the flow control data is utilized. Preferred functions for operating any of the plural different types of color measuring devices include a calibrate-position function, a calibrate-sensor function, a move-to-patch function, and a make-measurement function.

18 Claims, 10 Drawing Sheets

APPLICATION PROGRAMMING INTERFACE FOR MEASURING DEVICES

BACKGROUND OF THE INVENTION

This application is being filed with a microfiche appendix of computer program listings consisting of one (1) fiche having fifty-one (51) frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention concerns an application programming interface (API) usable by a software developer when writing an application program, such as a color calibration program, that uses a color measuring device. In particular, the present invention relates to an API that provides a common interface between such an application program and plural different types of color measuring devices.

DESCRIPTION OF THE RELATED ART

One common use of color measuring devices is to calibrate color fidelity of color recording devices. Typically, the recording device (such as a color laser beam printer or ink jet printer) records color patches on a recording medium. The color values of the patches are measured by the color measuring device, the measured values are compared against expected (or ideal) values, and the comparisons are used to calibrate the recording device.

Color measuring devices come in many different physical structures, such as XY tables, strip readers, hand-held patch readers, and flatbed scanners, and operate in different ways using different numbers and types of sensors. Color patches are input in different ways to color measuring devices which have different physical structures. For example, patches are input to an XY table on a sheet that has an array of patches printed thereon, whereas patches are input to a strip reader on strips that each have one or more rows of patches printed thereon. The sensors that actually perform color measurements are positioned on patches in different ways depending on the physical structures of the color measuring devices.

In order to make accurate color measurements for use in calibrating a color recording device, the color measuring devices themselves must be calibrated properly. For example, for some color measuring devices to position their sensor(s) accurately, the positioning mechanism in the color measuring devices must be calibrated. In addition, the sensors in some color measuring devices must be calibrated so as to ensure proper color measurements. Depending on the numbers and types of sensors as well as the physical structures of the color measuring devices, calibration of the position of the sensors and calibration of the sensors differ among different types of color measuring devices.

In addition, application programs that use color measuring devices should provide interfaces to the user. These interfaces should include instructions to the user at various points throughout operations performed using the color measuring devices. The timing and content of these instructions also differ among different color measuring devices.

As a result of the foregoing differences in operation among the different types of color measuring devices, a different command set is needed for each different type of device. Application programs that use the color measuring devices often must include different numbers of calls to commands in the different command sets in order to perform a same operation with different color measuring devices. In addition, the application programs often must include different interfaces for each different type of color measuring device. These different command sets and interfaces greatly complicate the task of writing application programs that perform color measurements. As a result, conventional application programs for performing color measurements must include separate and often lengthy routines for taking color measurements with each different type of supported device. In addition, once a conventional application program is written, that application program cannot use new types of color measuring devices, because the new device would require calls to commands in a new command set.

SUMMARY OF THE INVENTION

Accordingly, there is a need for an application programming interference (API) that allows a software developer to write a single set of routines for making color measurements using plural different types of color measuring devices.

The present invention addresses the foregoing need by providing an application programming interface that abstracts the operations needed to perform color measurements. An application program only needs to include calls to the functions in this API in order to use any supported type of color measuring device. The API in turn calls the necessary commands for performing color measurement operations.

In order to allow the application program to provide appropriate instructions during operations performed with a color measuring device, certain functions in the API are called numerous times in order to complete their respective operations. In order to enable the application program to call such a function a correct number of times, the API provides the application program with flow control data of the number of times that the function needs to be called so as to complete its operation with a particular color measuring device. The API also preferably provides the application program with display values for display so as to instruct the user in manipulating the color measuring device.

By virtue of the foregoing, the application program does not need to include separate routines for each different type of supported color measuring device. Instead, the application program need only include calls to the functions in the API and include mechanisms for handling display values and flow control data provided by the API. Moreover, if the API is implemented in a dynamically linkable library (DLL), an existing application program that calls the functions in the API can use new types of color measuring devices by linking to an updated version of the DLL.

Accordingly, in one aspect the invention is an API that provides a common interface between an application program and plural different types of color measuring devices each having at least one color measuring sensor. The API includes plural functions for operating any of the plural different types of color measuring devices. In order to complete an operation performed by at least one of the plural functions, the function that performs the operation must be called a number of times which is different for at least two different types of color measuring devices. For a particular color measuring device, the API provides the application program with flow control data of the number of times that the function must be called. This flow control data preferably can be provided by the function, in the form of a call-again value or as a numerical value, or by a separate function in the API such as a get-device-capabilities function. In some embodiments of the invention, a combination of these methods of providing the flow control data is utilized.

Preferably, the functions in the API also provide the application program with display values which are different for at least two different types of color measuring devices. The display values are for display to a user, preferably by the application program, so as to instruct the user in manipulating the color measuring device that is being operated.

In another aspect, the invention is an API that provides a common interface between an application program and plural different types of color measuring devices each having at least one color measuring sensor. The API includes plural functions for operating any of the plural different types of color measuring devices. The plural functions include a calibrate-position function, a calibrate-sensor function, a move-to-patch function, and a make-measurement function.

The calibrate-position function calibrates a relative position of a recording medium with respect to any of the plural different types of color measuring devices. Preferably, the calibrate-position function provides the application program with at least one display value that is to be displayed so as to instruct a user to position the recording medium or to position any of the color measuring sensors.

The calibrate-sensor function calibrates any of the color measuring sensors of any of the plural different types of color measuring devices. Preferably, the calibrate-sensor function provides the application program with at least one display value that is to be displayed so as to instruct the user in calibrating the sensor.

The move-to-patch function relatively positions any of the color measuring sensors and a color patch for any of the plural different types of color measuring devices. The move-to-patch function is provided with a logical color patch number by the application program. In order to relatively position the color patch and any of the color measuring sensors for some color measuring devices, the move-to-patch function preferably can provide the application program with a display value which instructs the user to manipulate the color measuring devices or to move the recording medium. In order to relatively position the color patch and any of the color measuring sensors for other color measuring devices, the move-to-patch function preferably causes the color measuring device to move the recording medium or to move the color measuring sensors. In any case, the move-to-patch function preferably provides the application program with a recalibrate value in a case that the relative position of the recording medium needs to be recalibrated, for example when a new recording medium is loaded into the color measuring device.

The make-measurement function makes a color measurement of the patch at which any of the color measuring sensors is relatively positioned, and the make-measurement function provides the application program with a color measurement value for the color patch. The make-measurement function preferably provides the application program with at least one display value that is to be displayed so as to instruct the user in making the color measurement. In addition, the make-measurement function preferably provides the application program with a recalibrate value in a case that any of the color measuring sensors needs to be recalibrated.

In order to complete an operation performed by at least one of the plural functions, the function that performs the operation must be called a number of times which is different for at least two different types of color measuring devices. For a color measuring device that is being operated, the API provides the application program with flow control data of the number of times that the function must be called. The flow control data preferably can be provided by the function, either in the form of a call-again value or a numerical value, or by a get-device-capabilities function included in the API.

The computer-executable process steps for the functions in the API preferably are stored in a dynamically linkable library (DLL). Thus, updated API functions can be used by an application program to access new types of measuring devices simply by linking the application program to the DLL.

The API according to the invention relieves application programs from the burden of having to include separate routines for taking color measurements with each different type of supported color measuring device. Instead, in order to take color measurements with any type of supported color measuring device, the application program need only include calls to functions in the API. The API itself handles the different interfaces to the different types of color measuring devices. As a result, the application program is far simpler to write.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
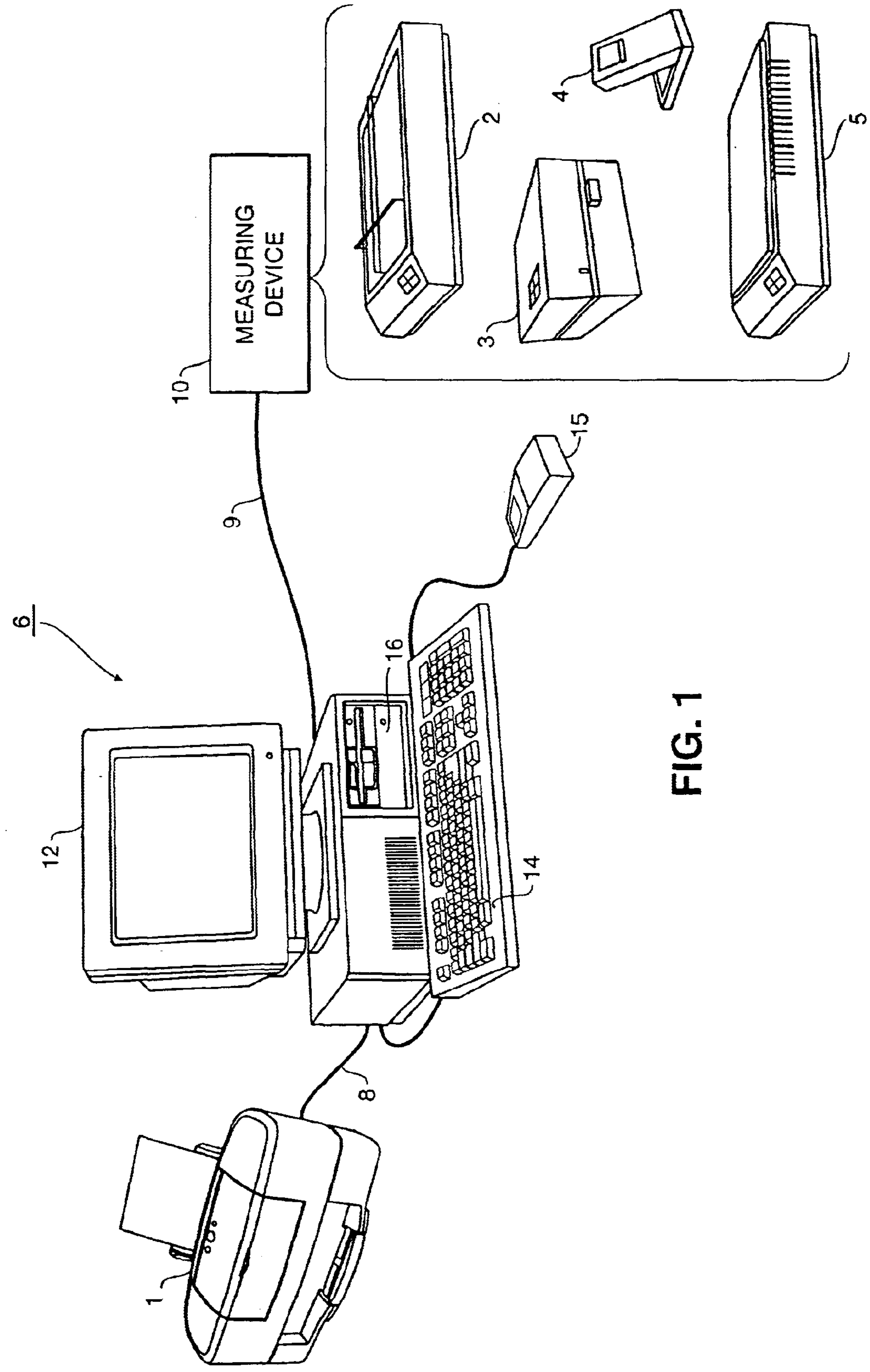
FIG. 1 is a representational view of a computer system in which color fidelity of a color printer is calibrated using a color measuring device.

FIG. 1 is a representational view of a computer system in which color fidelity of a color printer is calibrated using a color measuring device. Shown in FIG. 1 are color printer 1 and computer system 6, together with a variety of color measuring devices, such as XY table 2, strip reader 3, hand-held patch reader 4, and scanner 5.

Color printer 1 is depicted in FIG. 1 as an ink jet printer. However, any printer capable of printing color images on recording media can be utilized by a color calibration program written according to the invention, such as ink jet printers and laser printers. Color printer 1 prints color images in response to print jobs received from computer system 6 over printer interface 8.

Measuring device 10 is a color measuring device that is used to generate color measurements of color patches input thereto. The color measurements generated by color measuring device 10 are transmitted over measuring device interface 9 to computer system 6. Examples of measuring device 10 include XY table 2, strip reader 3, and hand-held patch reader 4 for reading individual color patches.

Color patches are input to each of the different types of color measuring devices in different ways. For example, patches are input to XY table 2 on a sheet that has an array of patches printed thereon, whereas patches are input to strip reader 3 on strips that each have one or more rows of patches printed thereon. The sensors that actually perform color measurements are positioned on patches in different ways depending on the physical structures of the color measuring devices. For example, XY table 2 typically includes motors and gimbals for automatically positioning the sensors, while hand-held patch reader 4 typically must be manually positioned over a patch.

Flatbed scanner 5 can also serve as a color measuring device, provided that scanner 5 is properly calibrated. Color patches are input to flatbed scanner 5 in a similar manner as the patches are input to XY table 2, namely on a sheet that has an array of patches printed thereon.

The different color measuring devices also can use entirely different types and arrangements of sensors for making the color measurements. For example, color measuring device 10 can be a spectrometer (i.e., a spectrophotometer or a spectroradiometer), which uses sensors that preferably measure light intensity for frequencies across the entire visible spectrum. Alternatively, color measuring device 10 can be a calorimeter or densitometer, which uses sensors that measure light intensity for XYZ or RGB components of the spectrum.

In any case, each of the color measuring devices have at least one color sensor for making color measurements. In order to ensure accurate color measurements, the sensor(s) should be calibrated. In addition, depending on the type of measuring device 10, a relative position of a recording medium with respect to the device might have to be calibrated. In particular, each time a new recording medium (e.g., strip or sheet) is input to color measuring device 10, the position of the recording medium should be recalibrated so that the color measuring device can properly locate color patches printed thereon.

Because of the different ways that color patches are input and measured by the different types of color measuring devices, a different command set is needed to calibrate and to make color measurements with each different type of color measuring device.

As shown in FIG. 1, computer system 6 is connected to printer 1 through printer interface 8 and measuring device 10 through measuring device interface 9. Provided with computer system 6 are display 12 which may be a color monitor, keyboard 14 for entering user commands, and pointing device 15 such as a mouse for pointing to and for manipulating graphical user interfaces and other objects displayed on display 12.

Computer system 6 also includes a mass storage device such as fixed disk 16. This mass storage device is for storing computer-executable process steps for a color calibration program and a measuring device DLL according to the invention, as well other application programs and an operating system including a printer driver and a measuring device driver. Such storage may also be provided by a CD-ROM (not shown).

It should be understood that, although a programmable general-purpose computer is shown in FIG. 1, a dedicated computer terminal or other type of data processing equipment can utilize the present invention.

Figure 2:
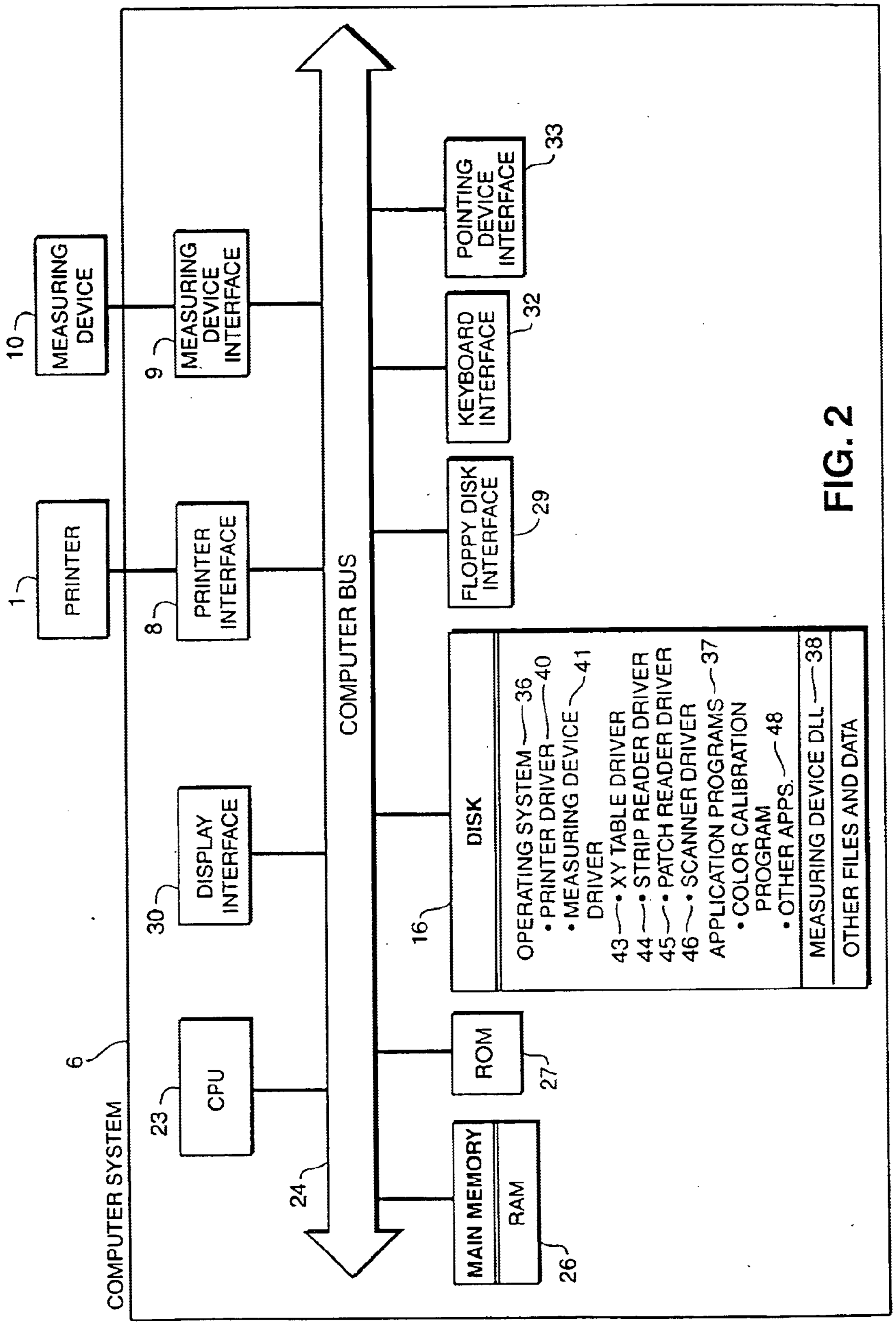
FIG. 2 is a detailed block diagram showing the internal architecture of the computer system shown in FIG. 1.

FIG. 2 is a detailed block diagram showing the internal architecture of computer system 6. As shown in FIG. 2, computer system 6 includes central processing unit 23 which interfaces with computer bus 24. Also interfacing with computer bus 24 are fixed disk 16, main memory (RAM) 26, read only memory (ROM) 27, floppy disk interface 29, display interface 30 to display 12 (not shown), keyboard interface 32 to keyboard 14 (not shown), pointing device interface 33 to pointing device 15 (not shown), printer interface 8 to color printer 1, and measuring device interface 9 to measuring device 10.

Main memory 26 interfaces with computer bus 24 so as to provide RAM storage to CPU 23 during execution of software applications. More specifically, CPU 23 loads process steps from fixed disk 16, another storage device, or some other source such as a network (not shown), into main memory 26. CPU 23 then executes the stored process steps from main memory 26 in order to execute application programs. Data such as print data and color measurement data can be stored in main memory 26, where the data can be accessed by CPU 23 during execution of the process steps.

As shown in FIG. 2, fixed disk 16 typically contains operating system 36, application programs 37, measuring device DLL 38 according to the invention, and other files and data. Operating system 36 includes printer driver 40 and measuring device driver 41. Measuring device driver 41 is one of plural different types of measuring device drivers corresponding to the type of measuring device 10 connected to computer system 6. Examples of measuring device driver 41 include XY table driver 43 for XY table 2, strip reader driver 44 for strip reader 3, patch reader driver 45 for hand-held patch reader 4, and scanner driver 46 for scanner S. Some or all of these drivers can be stored on fixed disk 16.

Application programs 37 include color calibration program 48. The structure and operation of color calibration program 48 is explained in more detail below with reference to FIG. 3.

Measuring device DLL 38 is a library of functions that are called by an application program so as to use any of plural different color measuring devices supported by the DLL. In order to write an application program that calls these functions, a software developer uses a measuring device API according to the invention, as explained below with reference to FIGS. 5 and 6.

Figure 3:
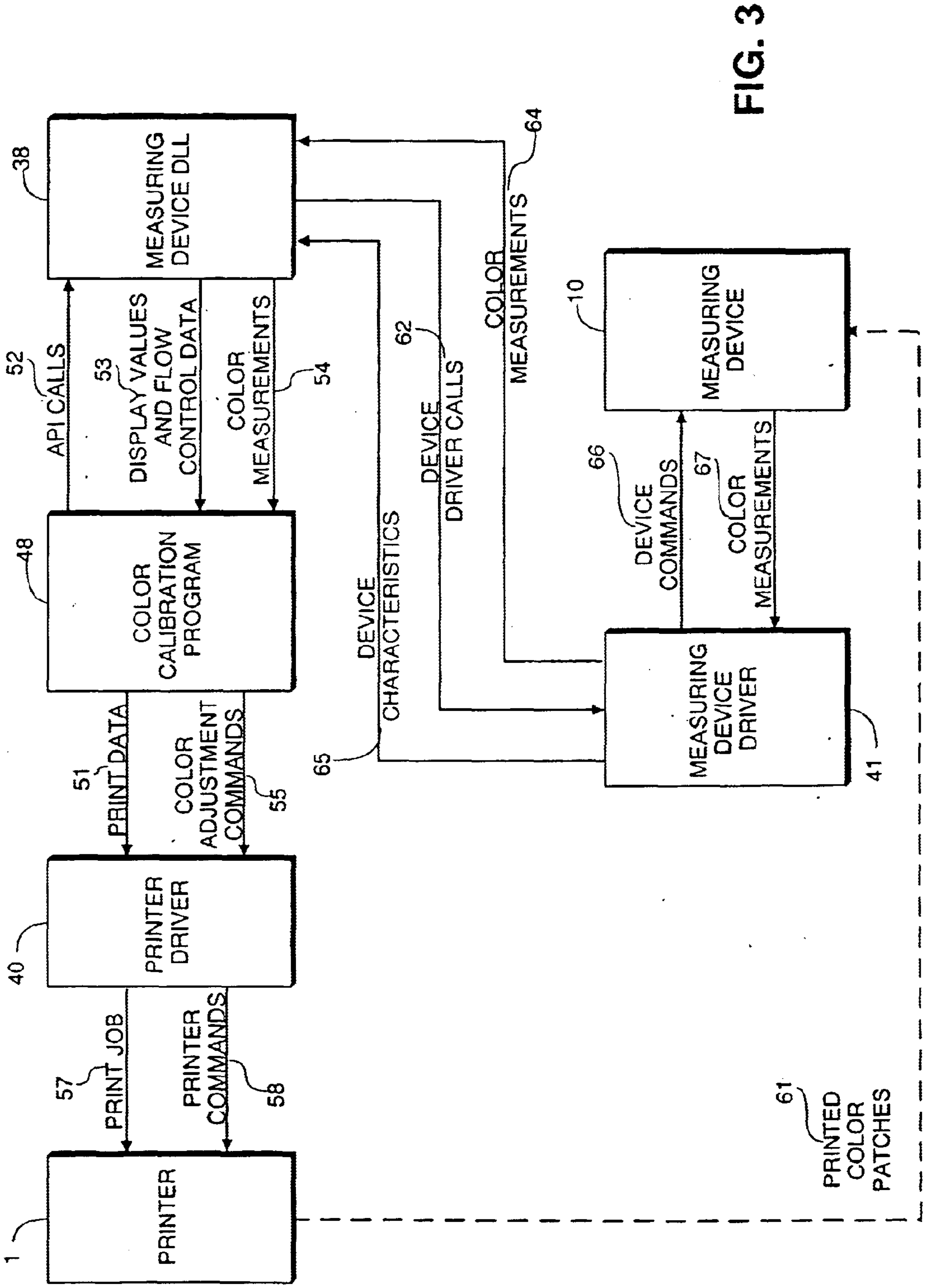
FIG. 3 is a block diagram for explaining a system for calibration of color fidelity of a color printer by a color calibration program according to the invention.

FIG. 3 is a block diagram for explaining a system for calibration of color fidelity of a color printer by a color calibration program according to the invention. In FIG. 3, color calibration program 48 runs on computer system 6 and sends print data 51 for printing color patches to printer driver 40. The color patches are for use in calibration of color printer 1.

Color calibration program 48 makes API calls 52 to functions provided by measuring device DLL 38 in order to make color measurements of the color patches. According to the invention, since the DLL encapsulates the functionality needed to operate many different color measuring device, it is possible for the color calibration program 48 to call exactly the same functions, in exactly the same order, no matter which of plural different types of color measuring devices are connected. Because of the difference in devices, however, the API often needs to have certain functions repeated, or operator interaction performed, in order for the different devices to be usable by a single application. Accordingly, in response to API calls 52, the functions in the DLL provide color calibration program 48 with information that the application needs to ensure that the API functions are called correctly. Such information might include, for example, display values for display by the application to the user so as to prompt the user for some user intervention (such as to prompt the user to insert a next sheet of patches into the measuring device), and the information might further include flow control data that instruct the application to alter its control flow such as by calling particular DLL functions multiple times until a needed result (such as position calibration) is achieved. Display values and flow control data 53 provided to color calibration program 48 are explained in more detail below with reference to FIGS. 4, 8 and 9.

Color calibration program 48 also is provided with color measurements 54 by the DLL. Based on color measurements 54, color calibration program 48 sends color adjustment commands 55 to printer driver 40 so as to adjust color fidelity of color printer 1. The operation of color calibration program 48 in printing and measuring the color patches and adjusting the color printer is explained in more detail below with reference to FIGS. 7A to 7C.

In response to print data 51 received from color calibration program 48, printer driver 40 sends print job 57 to color printer 1. Likewise, in response to color adjustment commands 55 received from color calibration program 48, printer driver 40 sends printer commands 58 to color printer 1.

Color printer 1 prints printed color patches 61 in response to print job 57 received from printer driver 40. The user inputs these color patches to color measuring device 10.

Measuring device DLL 38 provides a common interface between color calibration program 48 and plural different types of color measuring devices. As mentioned above, functions in measuring device DLL 38 are called by API calls 52 from color calibration program 48. The functions in measuring device DLL 38 make device driver calls 62 based on API calls 52 in order to operate measuring device 10. Device driver calls 62 are calls to a device driver corresponding to the type of color measuring device 10. For example, if measuring device 10 is an XY table, device driver calls 62 are calls to an XY table driver. In response to device driver calls 62, measuring device DLL 38 is provided with color measurements 64 by measuring device driver 41. Measuring device DLL 38 in turn provides color calibration program 48 with display values and flow control data 53 and color measurements 54. The flow control data preferably is based at least in part on device characteristics 65 received from measuring device driver 41. The structures of the functions in measuring device DLL 38 according to the invention are explained in more detail below with reference to FIGS. 4, 8 and 9, and the operation of the functions is explained with reference to FIGS. 7A to 7C.

Measuring device driver 41 is a device driver corresponding to the type of measuring device 10. Measuring device driver 41 receives device driver calls 62 from the functions in measuring device DLL 38. In response to these call, measuring device driver 41 sends device commands 66 to measuring device 10, which provides color measurements 67 to measuring device driver 41. Color measurements 67 in turn are provided to measuring device DLL 38 as color measurements 64.

As mentioned above, measuring device 10 receives printed color patches 61 as input. Measuring device 10 makes color measurements 67 of printed color patches 61 in accordance with device commands 66 received from measuring device driver 41. Measurement device 10 provides color measurements 67 to measuring device driver 41.

Figure 4:
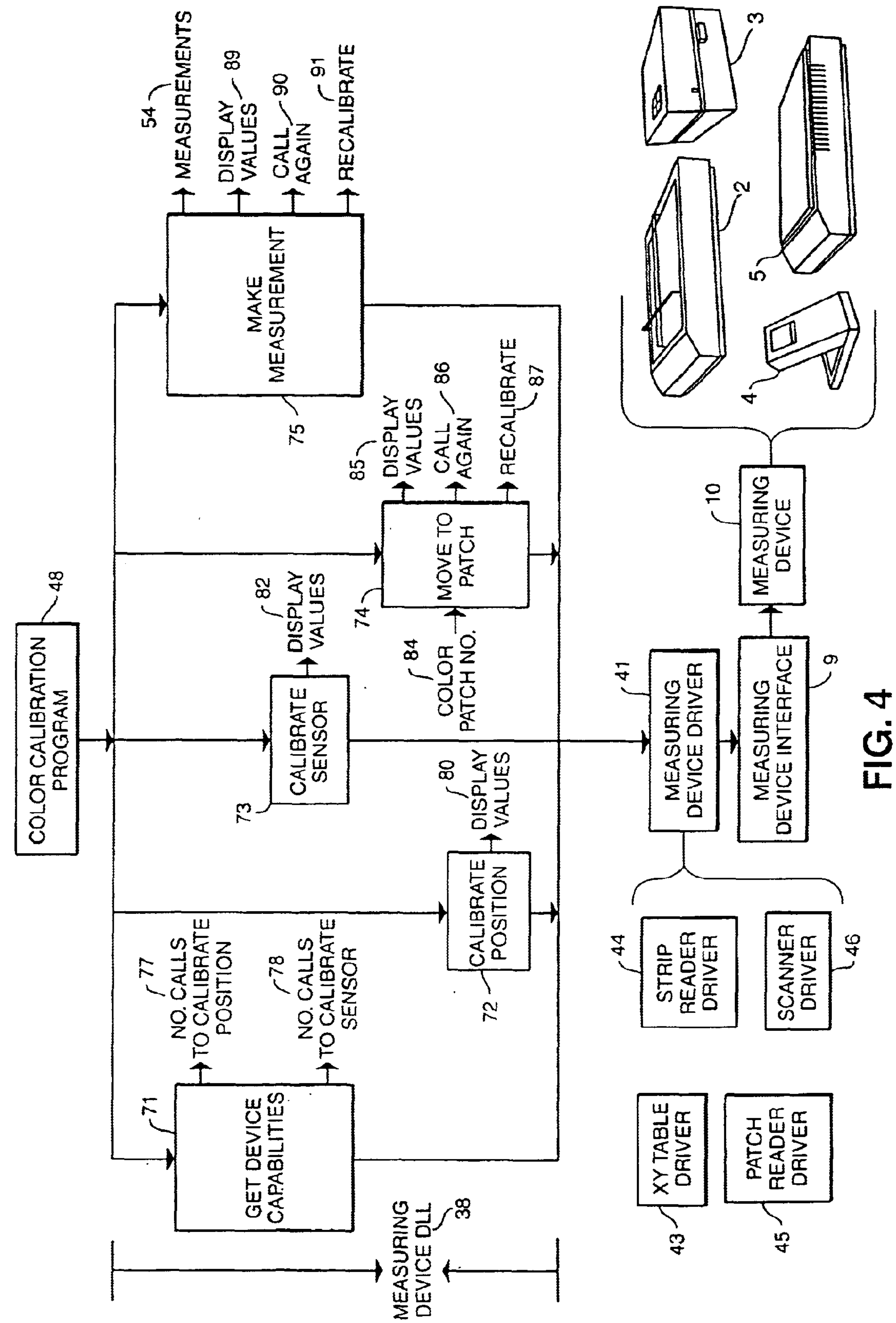
FIG. 4 is a block diagram for explaining a structure of a measuring device application programming interface (API) according to the invention.

FIG. 4 is a block diagram for explaining functionality provided in the DLL and accessed from the application through the API.

Briefly, the measuring device DLL illustrated in FIG. 4 is accessed through a measuring device API according to the invention. The API provides a common interface between an application program and plural different types of color measuring devices each having at least one color measuring sensor. The interface includes plural functions for operating any of the plural different types of color measuring devices. In order to complete an operation performed by one or more of the functions, the function that performs the operation must be called a number of times which is different for different types of color measuring devices. For a color measuring device that is being operated, the API provides the application program with flow control data of the number of times that the function must be called. In FIG. 4, this flow control data is provided for some of the functions by a separate get-device capabilities function. This flow control data is provided for other functions by the functions themselves, in the form of “call-again” values provided by the functions to the color calibration program. The functions in the API also preferably provide the application program with display values which are different for different types of color measuring devices. The values are displayed by the color calibration program to a user so as to instruct the user in manipulating the color measuring device that is being operated.

In more detail, FIG. 4 shows measuring device DLL 38 which is accessed by an application program through a measuring device API according to the invention. Thus, the API provides an interface for a software developer to write an application program that calls the functions in the DLL illustrated in FIG. 4. The functions provide an interface between color calibration program 48 and measuring device driver 41. Measuring device driver 41 in turn communicates with measuring device 10 through measuring device interface 9.

Measuring device driver 41 is a device driver corresponding to the type of measuring device 10. Thus, brackets next to measuring device driver 41 in FIG. 4 indicate that measuring device driver 41 is one of plural different device drivers such as XY table driver 43, strip reader driver 44, patch reader driver 45, and scanner driver 46. Likewise, brackets next to measuring device 10 in FIG. 4 indicate that measuring device 10 is one of XY table 2, strip reader 3, hand-held patch reader 4 for reading individual color patches, and scanner 5.

It should be noted that the various drivers and devices shown in FIG. 4 are only representative of the possible drivers and devices that can be operated using the API according to the invention.

In FIG. 4, measuring device DLL 38 includes at least the following functions, which are provided to an application program through a measuring device API according to the invention: get-device-capabilities 71, calibrate-position 72, calibrate-sensor 73, move-to-patch 74, and make measurement 75. Arrows pointing into blocks for these functions indicate information provided to the functions by color calibration program 48. Likewise, arrows pointing out of blocks for these functions indicate information provided by the functions to color calibration program 48.

Information can be provided in various different ways to the functions by color calibration program 48 and by the functions to color calibration program 48. For example, information can be provided to a function as a passed variable, by modification of a shared (e.g., global) variable or data space, by passing a pointer to a memory location that stores the information, or through messages in a message-based environment. Likewise, information can be provided by a function as a returned value, by modification of a shared variable or data space, by modification of a memory location pointed to by a pointer, or through messages. Any or all of these methods, as well as any other additional methods, can be utilized by measuring device DLL 38 according to the invention.

Get-device-capabilities function 71 according to the invention provides color calibration program 48 with flow control data for calibrate-position function 72 and calibrate-sensor function 73. In particular, get-device-capabilities function 71 provides color calibration program 48 with number of calls 77, thereby indicating the number of calls that must be made to calibrate-position function 72 in order to calibrate a position of a recording medium with respect to measuring device 10. Likewise, get-device-capabilities function 71 provides color calibration program 48 with number of calls 78, thereby indicating the number of calls that must be made to calibrate-sensor function 73 in order to calibrate the sensor(s) of measuring device 10.

The DLL preferably determines the flow control data by querying measuring device driver 41, or measuring device 10, for device characteristics 65. The functions in measuring device DLL determine the flow control data based at least in part on device characteristics 65. For example, if the device characteristics identify the type of measuring device 10, the functions can determine the flow control data using a look-up table. Alternatively, device characteristics 65 can include the flow control data directly, for later use by the different functions in the DLL. Get-device-capabilities function 71 preferably queries the device driver or the device for the device characteristics.

Calibrate-position function 72 is called to calibrate a relative position of a recording medium with respect to any of the plural different types of color measuring devices. In order to calibrate the relative position of the recording medium, calibrate-position function 72 might have to be called more than once. The number of calls depends at least in part on the type of measuring device 10. As discussed above, get-device-capabilities function 71 according to the invention provides color calibration program 48 with number of calls 77 that must be made to calibrate-position function 72 in order to complete the position calibration operation. Number of calls 77 preferably is based at least in part on device characteristics 65.

Each time calibrate-position function 72 is called, the user might be required to perform a task such as positioning the sensor(s), positioning the recording medium, or otherwise manipulating measuring device 10. Calibrate-position function 72 preferably provides display values 80 to color calibration program 48, and program 48 displays display values 80 to a user so as to instruct the user to perform these tasks, as necessary.

Display values 80, as well as all other display values provided by measuring device DLL 38, can include text and/or graphics, or any other type of values displayable by computer system 6. Because the application program actually displays the display values, the application program can determine the form of the display. For example, the application program can display text or graphics based on the display values. The display values do not necessarily need to be displayed visually. For example, if the application program includes text-to-speech functionality, the program can generate speech based on the display values.

Calibrate-sensor function 73 is called to calibrate the sensor(s) of any of the plural different types of color measuring devices. In order to calibrate the sensor(s), calibrate-sensor function 73 might have to be called more than once. As discussed above, get-device-capabilities function 71 according to the invention provides color calibration program 48 with number of calls 78 that must be made to calibrate-sensor function 73 so as to complete the sensor calibration operation. Number of calls 78 preferably is based at least in part on device characteristics 65.

Each time calibrate-sensor function 73 is called, the user might be required to perform a task such as manipulating measuring device 10. Calibrate-sensor function 73 preferably provides display values 82 to color calibration program 48 for display by the program to a user so as to instruct the user to perform any such tasks.

Move-to-patch function 74 is called to relatively position the sensor(s) and a color patch for any of the plural different types of color measuring devices. Move-to-patch function 74 is provided with logical color patch number 84 by color calibration program 48. In response, move-to-patch function 74 moves the sensor(s) or the recording medium so as to position the sensor(s) at the corresponding color patch, provides color calibration program 48 with display values 85 so as to instruct the user to move the sensor(s) or the recording medium, or both.

In order to relatively position the sensor(s) at the patch, move-to-patch function 74 might have to be called multiple times, depending on the type of measuring device 10. For example, if the color patch corresponding to color patch number 84 is on a next sheet or strip of recording medium, move-to-patch function 74 might have to be called a first time so as to instruct a user to change the sheet or strip, a second time so as to recalibrate the position of the recording medium (by providing a recalibrate value), and then a third time so as to move to the first patch on the recording medium. The number of times that move-to-patch function 74 needs to be called preferably is determined by the function based at least in part on device characteristics 65. If move-to-patch function 74 needs to be called multiple times, move-to-patch function 74 provides color calibration program 48 with flow control data indicating whether the function has been called the necessary number of times. As shown in FIG. 4, this flow control data takes the form of call-again value 86, which is provided if move-to-patch function 74 has not been called the necessary number of times.

In some situations, and in particular when a new recording medium is input to measuring device 10, the relative position of the recording medium and measuring device 10 might have to be recalibrated. Move-to-patch function 74 provides color calibration program 48 with recalibrate value 87 in such situations.

Make-measurement function 75 is called to make a color measurement of the patch at which the sensor(s) are relatively positioned. Make-measurement function 75 provides color calibration program 48 with color measurement 54 for the color patch. In addition, make-measurement function 75 preferably provides color calibration program 48 with display values 89 for display by the program to instruct the user to perform any necessary tasks for making the color measurement.

As with move-to-patch function 74, make-measurement function 75 might have to be called multiple times in order to complete its operation. The number of times that make-measurement function 75 needs to be called preferably is determined by the function based at least in part on device characteristics 65. If make-measurement function 75 needs to be called multiple times, make-measurement function 75 provides color calibration program 48 with flow control data indicating whether the function has been called the necessary number of times. As shown in FIG. 4, this flow control data takes the form of call-again value 90, which is provided if make-measurement function 75 has not been called the necessary number of times.

If the sensor(s) need to be recalibrated after a color measurement, for example after a certain number of color measurements, make-measurement function 75 provides color calibration program 48 with recalibrate value 91.

Figure 5:
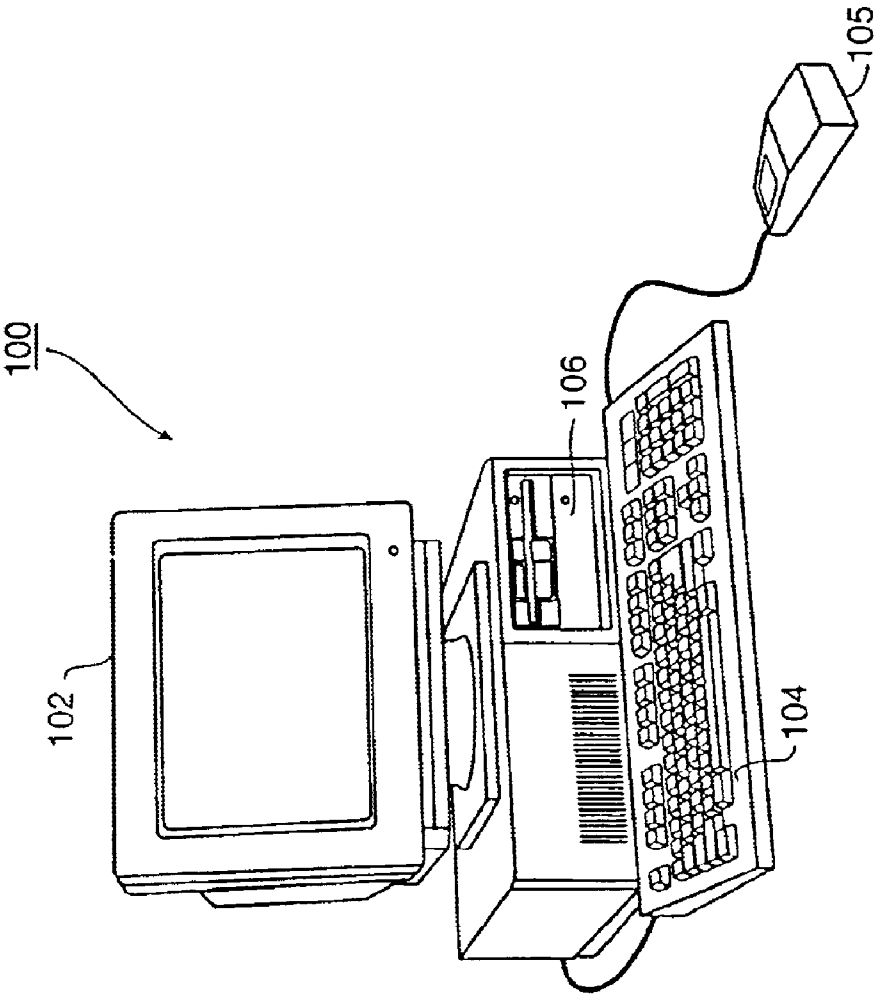
FIG. 5 is a representational view of a development system for development of an application program using a measuring device API according to the invention.

FIG. 5 is a representational view of a development system for development of an application program using a measuring device API according to the invention. As shown in FIG. 5, development system 100 is provided with display 102 which may be a color monitor, keyboard 104 for entering user commands and for entering code for an application program, and pointing device 105 such as a mouse. Development system 100 also includes a mass storage device such as fixed disk 106. This mass storage device is for storing computer-executable process steps for an operating system, software development programs, and a measuring device API according to the invention. Such storage may also be provided by a CD-ROM (not shown).

It should be understood that, although development system 100 is shown as a programmable general-purpose computer in FIG. 5, a dedicated computer terminal or other type of data processing equipment can be used to write application programs utilizing the API according to the present invention.

Figure 6:
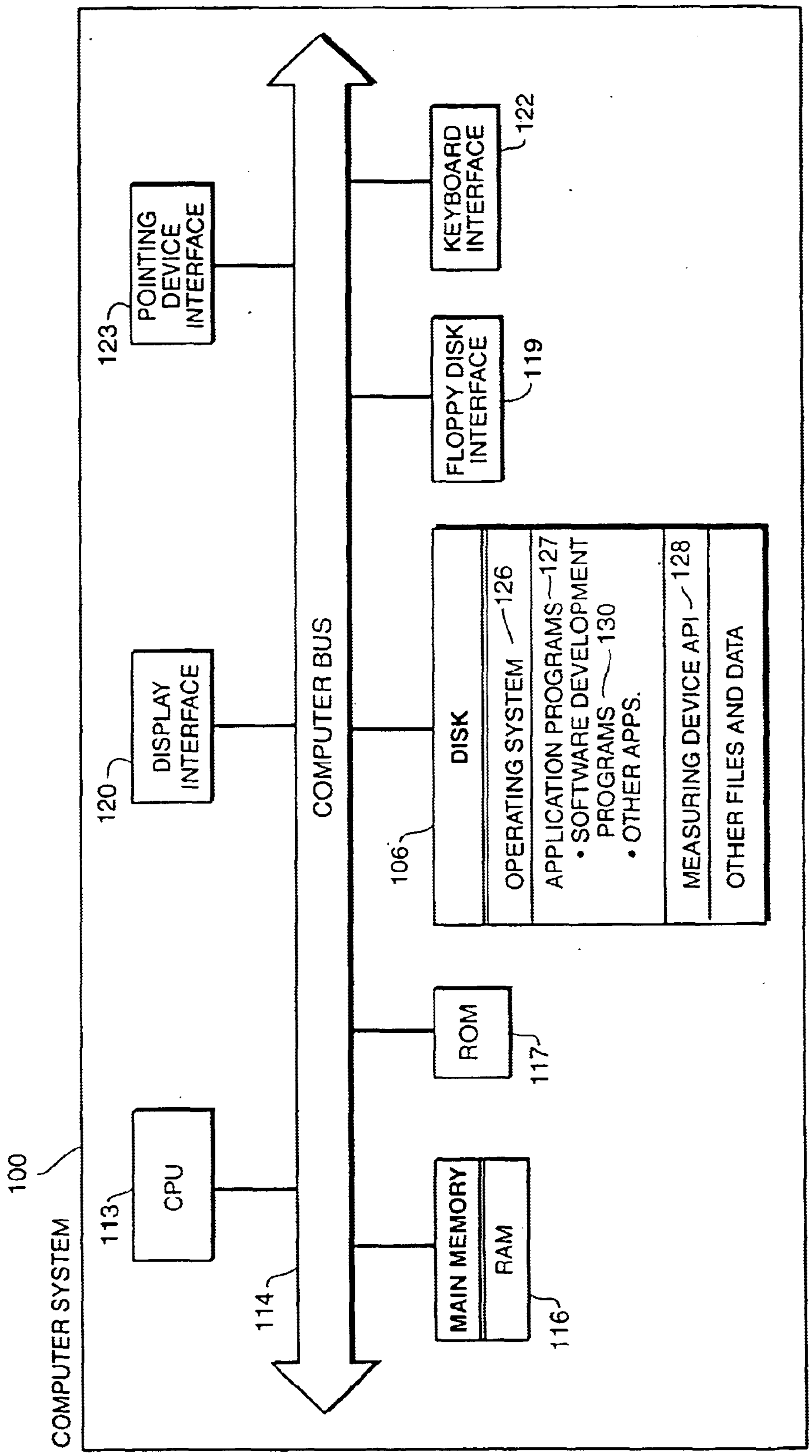
FIG. 6 is a detailed block diagram showing the internal architecture of the development system shown in FIG. 5.

FIG. 6 is a detailed block diagram showing the internal architecture of development system 100. As shown in FIG. 6, development system 100 includes central processing unit 113 which interfaces with computer bus 114. Also interfacing with computer bus 114 are fixed disk 106, main memory (RAM) 116, read only memory (ROM) 117, floppy disk interface 119, display interface 120 to display 102 (not shown), keyboard interface 122 to keyboard 104 (not shown), and pointing device interface 123 to pointing device 105 (not shown).

Main memory 116 interfaces with computer bus 114 so as to provide RAM storage to CPU 113 during execution of software applications. More specifically, CPU 113 loads process steps from fixed disk 106, another storage device, or some other source such as a network (not shown), into main memory 116. CPU 113 then executes the stored process steps from main memory 116 in order to execute application programs. Data such as code for an application program utilizing a measuring device API according to the invention can be stored in main memory 116, where the data can be accessed by CPU 113 during execution of the process steps.

As shown in FIG. 6, fixed disk 106 typically contains operating system 126, application programs 127, and measuring device API 128 according to the invention. Operating system 126 typically is a windowing operating system and preferably is compatible with operating system 36 of computer system 6. Application programs 127 preferably includes software development programs 130 for developing application programs for making color measurements with color measuring devices.

A software developer uses software development programs 130 to write code for an application program such as color calibration program 4B. The software developer includes calls to functions provided by measuring device API 128 in order to have the application program make color measurements with any color measuring device supported by the API.

The API preferably includes headers corresponding to the functions in measuring device DLL 38. When the software developer compiles the code for application program using software development programs 130, these headers allow the application program to access the functions in measuring device DLL 38. These functions provide a common interface to any of the plural supported color measuring devices. Therefore, as long as the application program includes code for handling flow control data and display values returned by the functions in the DLL, as described above with reference to FIGS. 3 and 4, the application program is able to make color measurements with any of the plural supported color measuring devices.

Figure 7A:
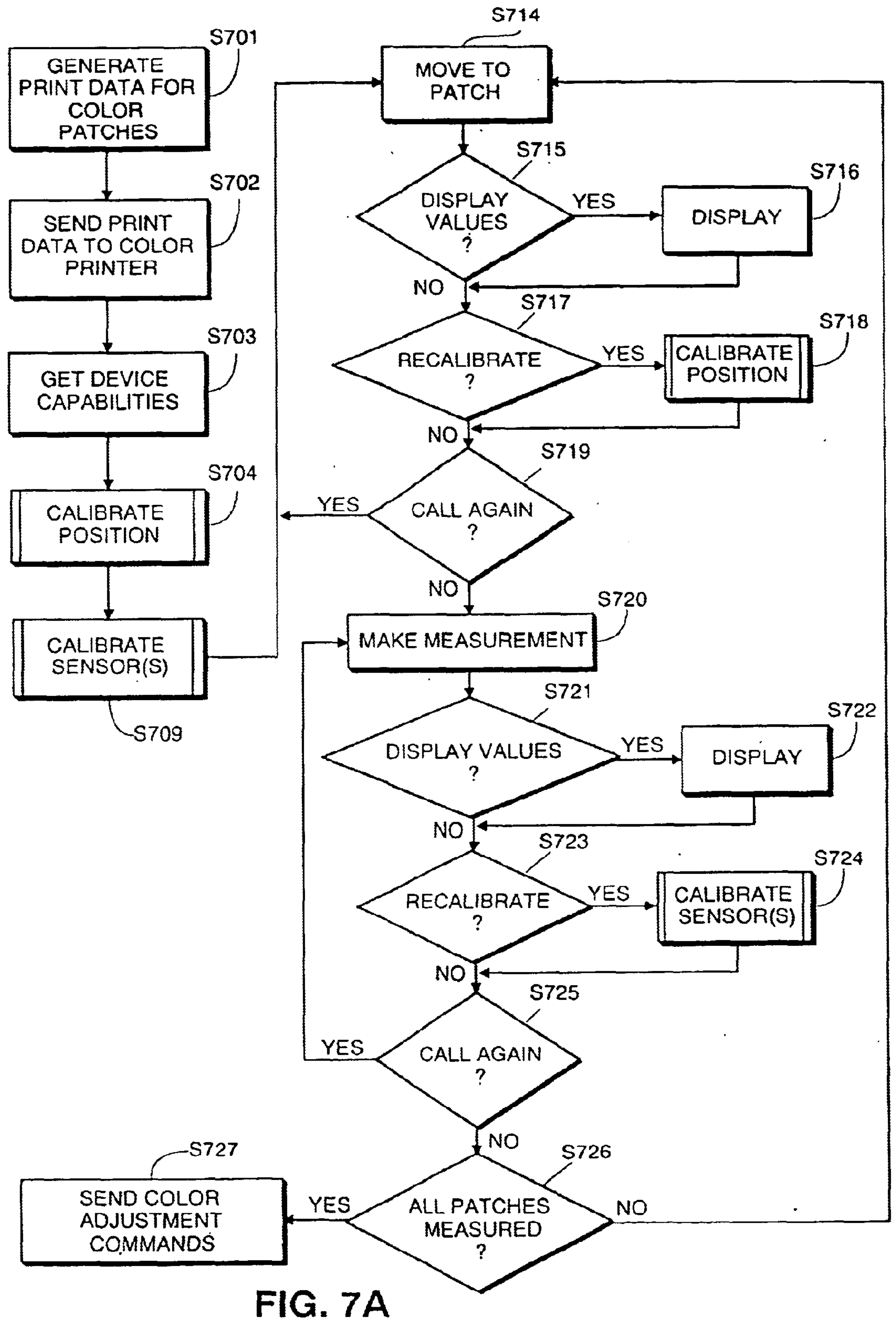
FIGS. 7A to 7C are flowcharts for explaining color calibration by a color calibration program using a measuring device API according to the invention.
Figure 7B:
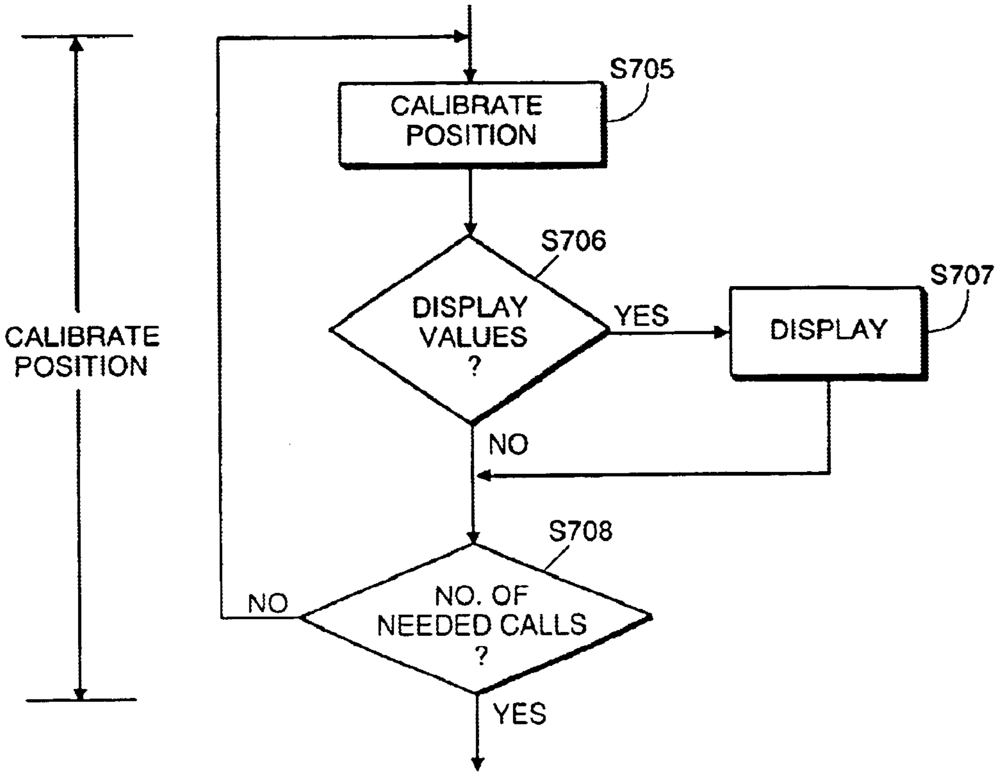
Figure 7C:
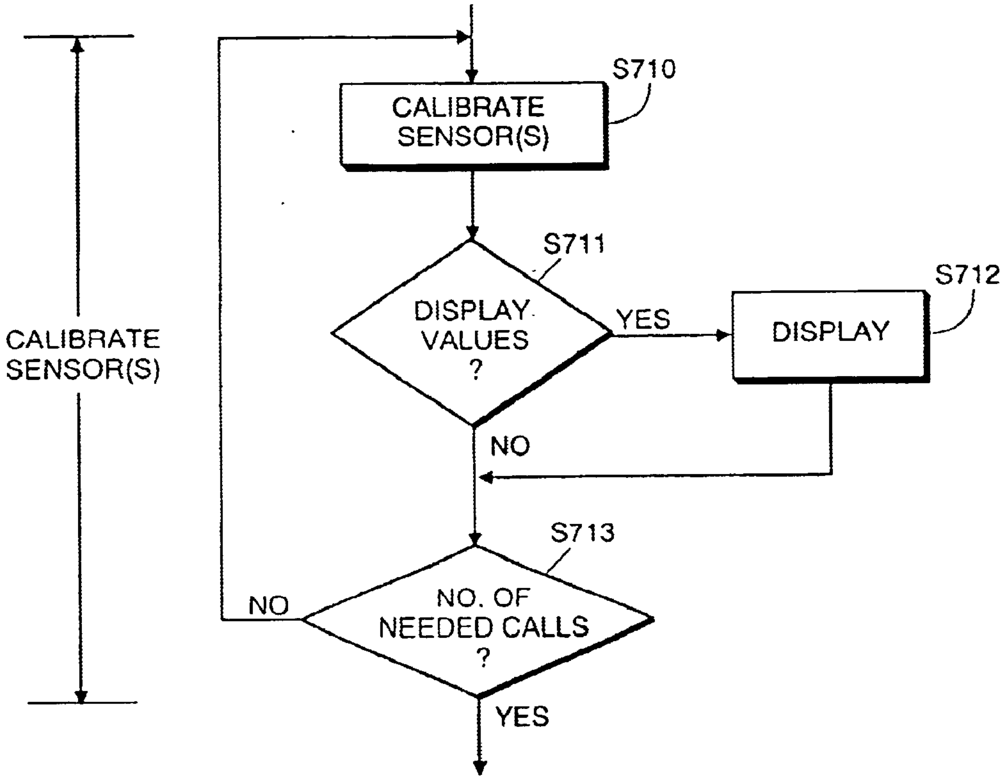

FIGS. 7A to 7C are flowcharts for explaining a representative color calibration application using a measuring device API according to the invention.

In step S701 in FIG. 7A, color calibration program 48 generates print data 51 for color patches for calibration of color fidelity of color printer 1. In step S702, color calibration program 48 sends print data 51 to printer driver 40, which in turn sends print job 57 to color printer 1 based on print data 51. Color printer 1 prints the print job onto a recording medium, resulting in printed color patches 61.

In step S703, color calibration program 48 makes API call 52 to get-device-capabilities function 71 in measuring device DLL 38. In response, get-device-capabilities function 71 provides flow control data to calibration program 48. This flow control data preferably includes number of calls 77 and number of calls 78, which indicate the number of times calibrate-position function 71 and calibrate-sensor function 72 need to be called in order to perform their respective operations.

In step S704, the relative position of the sensor(s) with respect to the recording medium is calibrated. FIG. 7B is a flowchart for explaining position calibration according to the invention.

In step S705 of FIG. 7B, color calibration program 48 calls calibrate-position function 72. This function sends device driver calls 62 to measuring device driver 41, which in turn sends device commands 66 to measuring device 10 so as to calibrate the relative position of the sensor(s).

In step S706, color calibration program 48 determines if calibrate-position function 72 provided display values 80. If calibrate-position function 72 did provide display values 80, color calibration program 48 displays the display values to the user, such as on display 12, in step S707.

In step S708, color calibration program 48 determines if calibrate-position function 72 has been called the number of times indicated by number of calls 77. If calibrate-position function 72 has not been called number of calls 77 times, flow returns to step S705. Once calibrate-position function 72 has been called number of calls 77 times, flow returns to FIG. 7A.

In FIG. 7A, flow proceeds to step S709, where the sensor(s) are calibrated. FIG. 7C is a flowchart for explaining sensor calibration according to the invention.

In step S710 of FIG. 7C, color calibration program 48 calls calibrate-sensor function 72. This function sends device driver calls 62 to measuring device driver 41, which in turn sends device commands 66 to measuring device 10 so as to calibrate the sensor(s).

In step S711, color calibration program 48 determines if calibrate-sensor function 73 provided display values 82. If calibrate-sensor function 73 did provide display values 82, color calibration program 48 displays the display values to the user in step S712.

In step S713, color calibration program 48 determines if calibrate-sensor function 73 has been called the number of time indicated by number of calls 78. If calibrate-sensor function 73 has not been called number of calls 78 times, flow returns to step S710. Once calibrate-sensor function 73 has been called number of calls 78 times, flow returns to FIG. 7A.

Returning to FIG. 7A, flow proceeds to step S714, where move-to-patch function 74 is called. Color calibration program 48 provides move-to-patch function 74 with color patch number 84, which is a logical patch number corresponding to the next patch that needs to be measured. Preferably, color patch number 84 is incremented every time a color patch is measured. Based on color patch number 84 and the type of measuring device 10, move-to-patch function 74 of measuring device DLL 38 sends device driver calls 62 to device driver 41. Device driver 41 in turn sends device commands 66 to measuring device 10, which moves the sensor(s) or the recording medium, if appropriate, in order to relatively position the patch.

In step S715, color calibration program 48 determines if move-to-patch function 74 provided display values 85 to the program. If move-to-patch function 74 did provide display values 85, color calibration program 48 displays the display values to the user in step S716.

With some color measuring devices, move-to-patch function 74 cannot move the sensor(s) or the recording medium. For example, hand-held patch reader 4 has no mechanism for moving its sensor(s) or a recording medium. Rather, the user must move the sensor(s) or the recording medium. In that case, display values 85 sent in step S716 instructs the user to perform this task, as necessary.

In step S717, color calibration program 48 determines if move-to-patch function 74 has indicated that position of the recording medium needs to be recalibrated. If the position does need to be recalibrated, flow proceeds to step S718, where the position is recalibrated as explained above with reference to FIG. 7B.

Flow proceeds to step S719, where color calibration program 48 determines if move-to-patch function 74 needs to be called again so as to complete positioning of the sensor(s). Color calibration program 48 makes this determination by checking for flow control data from move-to-patch function 74 in the form of call-again value 86. If move-to-patch function 74 needs to be called again, flow returns to step S714. Otherwise, flow proceeds to step S720.

In step S720, color calibration program 48 calls make-measurement function 75. This function sends device driver calls 62 to measuring device driver 41, which in turn uses device commands 66 to instruct measuring device 10 to make a color measurement. Once the measuring operation is complete, measuring device 10 generates color measurement 67 based on this measuring operation and sends color measurement 67 to measuring device driver 41. Measuring device driver 41 sends this color measurement to make-measurement function 75 in measuring device DLL 38 in the form of color measurement 64, and the make-measurement function provides the measurement to color calibration program 48 as color measurement 54.

In step S721, color calibration program 48 determines if make-measurement function 75 provided display values 89 to the program. If make-measurement function 75 did provide display values 89, color calibration program 48 displays the display values to the user in step S722.

In step S723, color calibration program 48 determines if make-measurement function 75 has indicated that the sensor(s) need to be recalibrated. If the sensor(s) do need to be recalibrated, flow proceeds to step S724, where the sensor(s) are recalibrated as explained above with reference to FIG. 7C.

Flow proceeds to step S725, where color calibration program 48 determines if make-measurement function 75 needs to be called again so as to complete making the color measurement. Color calibration program 48 makes this determination by checking for flow control data from make-measurement function 74 in the form of call-again value 90. If make-measurement function 75 needs to be called again, flow returns to step S720. Otherwise, flow proceeds to step S726.

In step S726, color calibration program 48 determines if all color patches for calibrating color printer 1 have been measured. If more color patches need to be measured, flow returns to step S714. Otherwise, flow proceeds to step S727.

In step S727, color calibration program 48 generates color adjustment commands 55 based at least in part on color measurements 54. Color calibration program 48 sends these commands to printer driver 40, which in turn sends print commands 58 to color printer 1 so as to adjust the color fidelity of the printer.

Because each of the functions in measuring device DLL 38 accessed through measuring device API 128 makes device driver calls 62 to measuring device 41 for the type of color measuring device 10, color calibration program 48 is insulated from the differences between different types of color measuring devices. Furthermore, the flow control data for multiple calls provided to color calibration program 48 allows the program to call the functions the necessary number of times for each operation without knowing the type of the actual device. The display values provided to the program allow the program to display the display values appropriate for the type of measuring device 10 that is being used. Moreover, since the application program generates displays based on the display values rather than the DLL, the application program can package a message however it wants so as to permit each developer to give his application a unique and internally-consistent GUI. As a result, a block of code that accesses color measuring device DLL 38 can make color measurements with any type of color measuring device supported by the API, despite the different device driver commands needed to calibrate and operate the different types of devices.

Included in a microfiche appendix submitted herewith is sample code that operates generally as described above. This code includes code for a portion of a color calibration program that makes color measurements using an API according to the invention, the API itself, and a DLL accessed through the API. This code is provided for illustrative purposes only. Other implementations of the color measurement code, measuring device API, and measuring device DLL exist that are within the scope and spirit of the invention.

Figure 8:
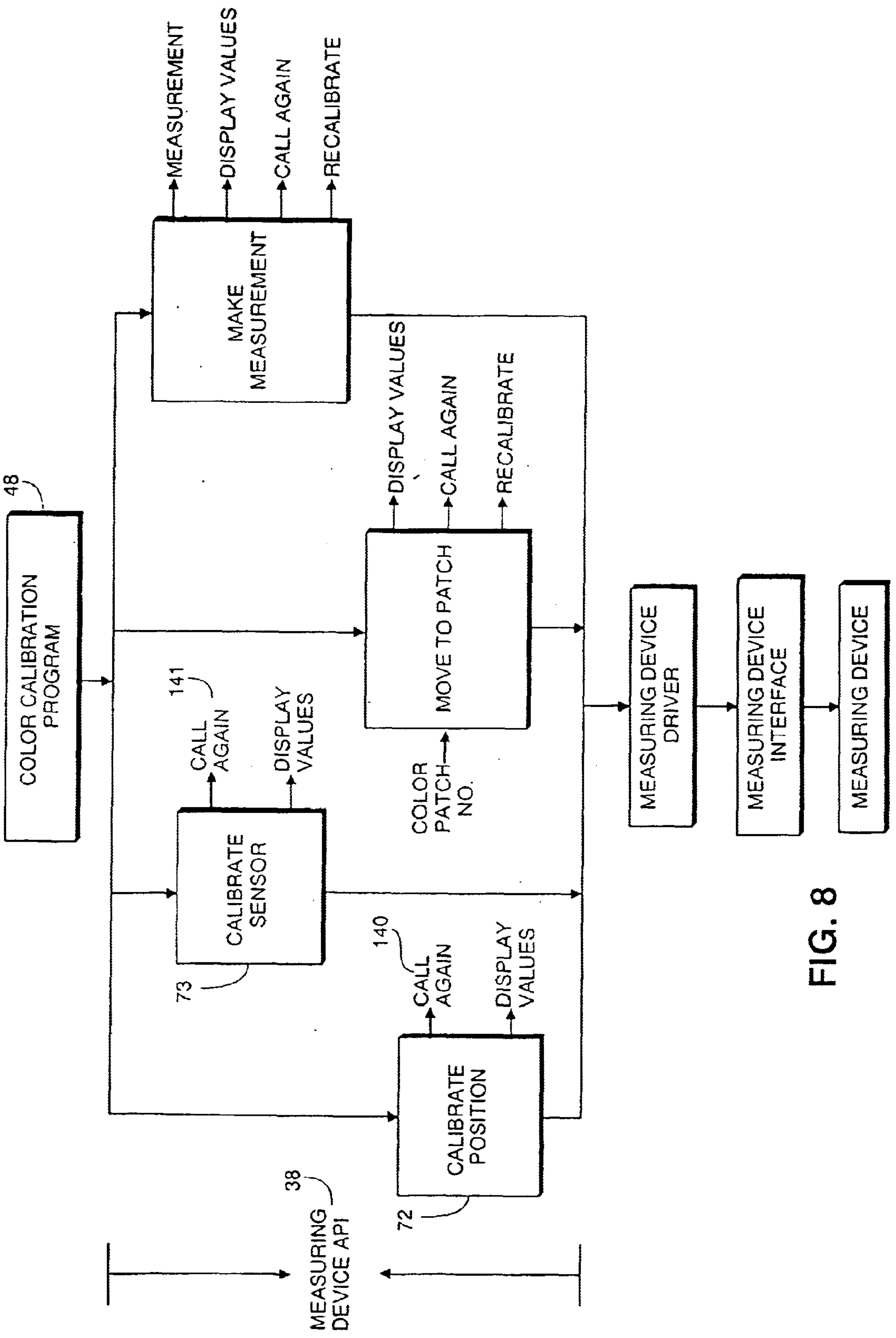
FIG. 8 is a block diagram for explaining a variation of the structure of the measuring device API according to the invention.

FIG. 8 is a block diagram for explaining a variation of the structure of the measuring device DLL according to the invention and of the API used to access the DLL. As shown in FIG. 8, both calibrate-position function 72 and calibrate-sensor function 73 can provide call-again values 140 and 141, respectively, to color calibration program 48. These call-again values are provided by these functions when they need to be called more than once in order to complete their respective operations.

Because the calibration functions can return these call-again values to facilitate multiple calls, there is no need for get-device-capabilities function 71 to provide number of calls 77 and number of calls 78 to the calibration functions of course, get-device-capabilities function 71 can still be included in the API, if desired.

Figure 9:
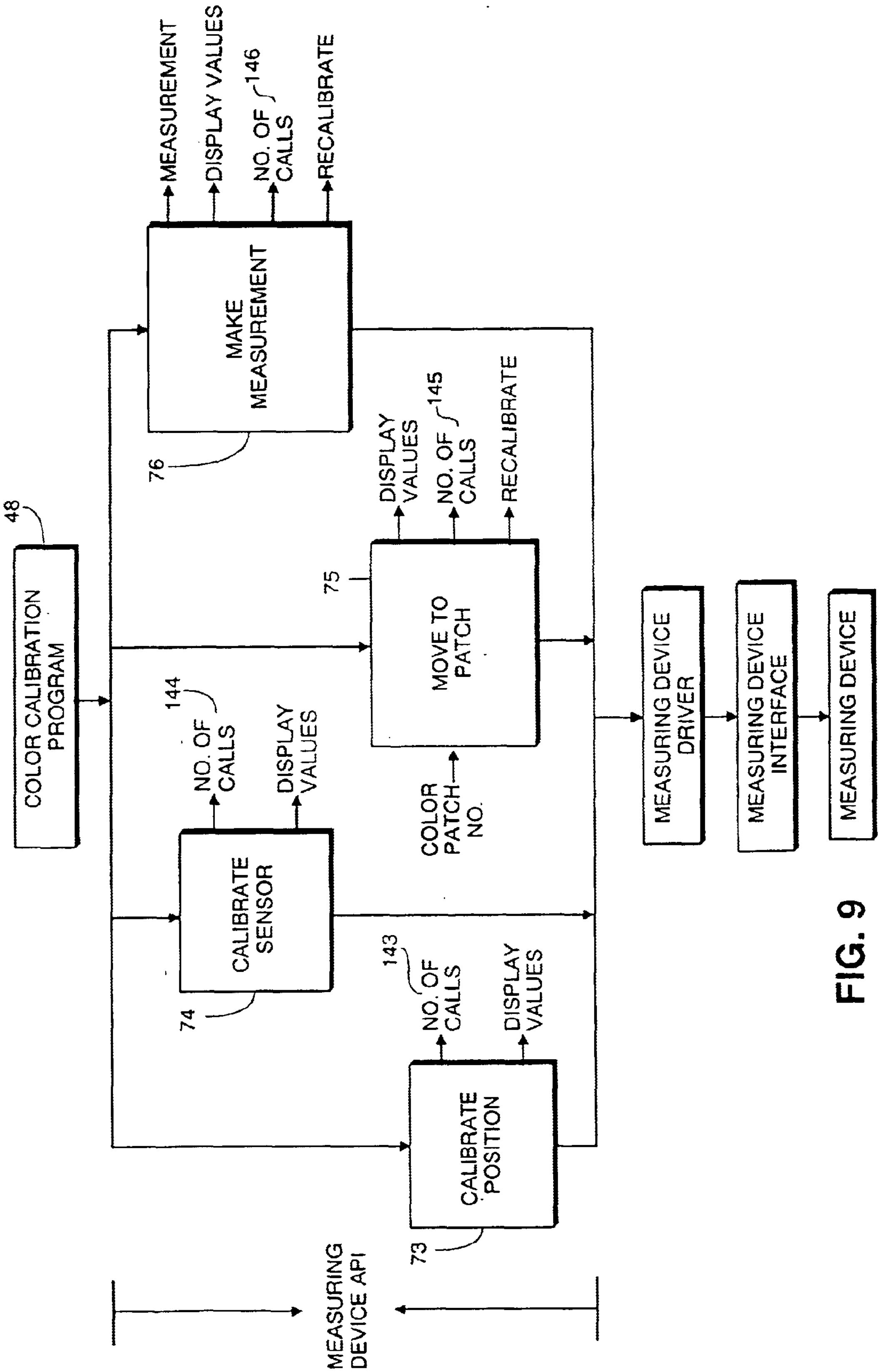
FIG. 9 is a block diagram for explaining another variation of the structure of the measuring device API according to the invention.

FIG. 9 is a block diagram for explaining another variation of the structure of the measuring device API according to the invention. In this variation, each of the functions in the API provides flow control data in the form of a "number of calls" value to indicate how many times that function should be called in order to complete its respective operation. Thus, calibrate-position function 72 provides number of calls 143, calibrate-sensor function 73 provides number of calls 154, move-to-patch function 74 provides number of calls 155, and make-measurement function 75 provides number of calls 156. These values can be a total number of calls that need to be made to each function. For example, if three calls need to be made to calibrate-position function 72, then that function would provide a value of "three" each time it was called. Alternatively, each function can maintain an internal state variable and provide the application program with a number of remaining calls that must be made in order to complete an operation. For example, calibrate-position function 72 would return a value of "three" the first time it was called to perform a position calibration, a "two" the next time, and a "one" the next time. Again, because each function provides the number of times that function needs to be called, there is no need for get-device-capabilities function 71.

Various combinations of the foregoing flow control techniques illustrated in FIGS. 4, 8 and 9 can be used for facilitating multiple calls of the function in measuring device DLL 38.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. Computer-executable process steps to provide a software application programming interface (API) comprising a common software interface between an application program and plural different types of color measuring devices each having at least one color measuring sensor, and plural functions for operating the plural different types of color measuring devices, the process steps comprising the steps of:

receiving a call to a function from the application program, and calling a measuring device driver based on the called function to operate a color measurement device, wherein the plural functions comprise:

a calibrate-position function to calibrate a relative position of a recording medium with respect to the plural different types of color measuring devices;

a calibrate-sensor function to calibrate the color measuring sensors of the plural different types of color measuring devices;

a move-to-patch function to relatively position the color measuring sensors and a color patch for the plural different types of color measuring devices, the move-to-patch function being provided with a logical color patch number by the application program; and a make-measurement function to make a color measurement of the patch at which the color measuring sensors is relatively positioned, the make-measurement function providing the application program with a color measurement value for the color patch, and wherein for a color measuring device that is being operated, the API provides the application program with flow control data of the number of times that the function must be called.

2. Computer-executable process steps according to claim 1, wherein the calibrate-position function provides the application program with at least one display value that is to be displayed so as to instruct a user to position the recording medium or to position any of the color measuring sensors.

3. Computer-executable process steps according to claim 1, wherein the calibrate-sensor function provides the application program with at least one display value that is to be displayed so as to instruct the user in calibrating the sensor.

4. Computer-executable process steps according to claim 1, wherein the move-to-patch function causes the color measuring device to move any of the color measuring sensors so as to relatively position any of the color measuring sensors and the color patch.

5. Computer-executable process steps according to claim 1, wherein the move-to-patch function causes the color measuring device to move the recording medium so as to relatively position any of the color measuring sensors and the color patch.

6. Computer-executable process steps according to claim 1, wherein the make-measurement function provides the application program with at least one display value that is to be displayed so as to instruct the user in making the color measurement.

7. Computer-executable process steps according to claim 1, wherein the plural functions further comprise a get-device-capabilities function to provide the application program with the flow control data.

8. Computer-executable process steps according to claim 1, wherein the plural different types of color measuring devices include XY tables and hand-held patch readers.

9. Computer-executable process steps according to claim 1, wherein the plural different types of color measuring devices include spectrometers and densitometers.

10. Computer-executable process steps to provide an application programming interface (API), the API providing a common interface between an application program and plural different types of color measuring devices each having at least one color measuring sensor, the computer-executable process steps comprising plural functions for operating any of the plural different types of color measuring devices, the plural functions comprising:

a calibrate-position function to calibrate a relative position of a recording medium with respect to any of the plural different types of color measuring devices, the calibrate-position function providing the application program with a position-calibration display value that is to be displayed so as to instruct a user to position the recording medium or to position any of the color measuring sensors;

a calibrate-sensor function to calibrate any of the color measuring sensors of any of the plural different types of color measuring devices, the calibrate-sensor function providing the application program with a sensor-calibration display value to the application program, the sensor-calibration display value to be displayed so as to instruct the user in calibrating any of the color measuring sensors;

a move-to-patch function to relatively position any of the color measuring sensors and a color patch for any of the plural different types of color measuring devices, the move-to-patch function being provided with a logical color patch number by the application program, providing the application program with a call-again value in a case that the move-to-patch function needs to be called multiple times to complete the relative positioning of the color measuring sensors and has not yet been called the multiple times, and providing the application program with a move-to-patch display value that is to be displayed so as to instruct the user in positioning any of the color measuring sensors; and a make-measurement function to make a color measurement of the patch at which any of the color measuring sensors is relatively positioned, the make-measurement function providing the application program with a color measurement value for the color patch, providing the application program with a call-again value in a case that the make-measurement function needs to be called multiple times to complete making the color measurement of the color patch and has not yet been called the multiple times, and providing the application program with a measurement display value that is to be displayed so as to instruct the user in making the color measurement.

11. Computer-executable process steps according to claim 10, further comprising a get-device-capabilities function to provide the application program with a number of times that the calibrate-position function needs to be called so as to calibrate the relative position of the recording medium and to provide the application program with a number of times that the calibrate-sensor function needs to be called so as to calibrate any of the color measuring sensors.

12. Computer-executable process steps according to claim 10, wherein the calibrate-position function further provides the application program with a number of times that the calibrate-position function needs to be called so as to calibrate the relative position of the recording medium.

13. Computer-executable process steps according to claim 10, wherein the calibrate-position function further provides the application program with a call-again value in a case that the calibrate-position function needs to be called multiple times so as to calibrate the relative position of the recording medium and has not yet been called the multiple times.

14. Computer-executable process steps according to claim 10, wherein the move-to-patch display value instructs the user to manipulate any of the color measuring devices so as to relatively position any of the color measuring sensors and the color patch.

15. A computer-readable medium storing computer-executable process steps, the computer-executable process steps to provide an application programming interface (API), the API providing a common interface between an application program and plural different types of color measuring devices each having at least one color measuring sensor, the computer-executable process steps comprising plural functions for operating any of the plural different types of color measuring devices, the plural functions comprising:

a calibrate-position function to calibrate a relative position of a recording medium with respect to any of the plural different types of color measuring devices, the calibrate-position function providing the application program with a position-calibration display value that is to be displayed so as to instruct a user to position the recording medium or to position any of the color measuring sensors;

a calibrate-sensor function to calibrate any of the color measuring sensors of any of the plural different types of color measuring devices, the calibrate-sensor function providing the application program with a sensor-calibration display value to the application program, the sensor-calibration display value to be displayed so as to instruct the user in calibrating any of the color measuring sensors;

a move-to-patch function to relatively position any of the color measuring sensors and a color patch for any of the plural different types of color measuring devices, the move-to-patch function being provided with a logical color patch number by the application program, providing the application program with a call-again value in a case that the move-to-patch function needs to be called multiple times to complete the relative positioning of the color measuring sensors and has not yet been called the multiple times, and providing the application program with a move-to-patch display value that is to be displayed so as to instruct the user in positioning any of the color measuring sensors; and a make-measurement function to make a color measurement of the patch at which any of the color measuring sensors is relatively positioned, the make-measurement function providing the application program with a color measurement value for the color patch, providing the application program with a call-again value in a case that the make-measurement function needs to be called multiple times to complete making the color measurement of the color patch and has not yet been called the multiple times, and providing the application program with a measurement display value that is to be displayed so as to instruct the user in making the color measurement.

16. A computer-readable medium according to claim 15, further comprising a get-device-capabilities function to provide the application program with a number of times that the calibrate-position function needs to be called so as to calibrate the relative position of the recording medium and to provide the application program with a number of times that the calibrate-sensor function needs to be called so as to calibrate any of the color measuring sensors.

17. A computer-readable medium according to claim 15, wherein the move-to-patch display value instructs the user to manipulate any of the color measuring devices so as to relatively position any of the color measuring sensors and the color patch.

18. A computer-executable method for providing a software application programming interface (API) comprising a common software interface between an application program and plural different types of color measuring devices each having at least one color measuring sensor, and comprising plural functions for operating the plural different types of color measuring devices, the method comprising the steps of:

receiving a call to a function from the application program, and calling a measuring device driver based on the called function to operate a color measurement device, wherein the plural functions comprise:

a calibrate-position function to calibrate a relative position of a recording medium with respect to the plural different types of color measuring devices;

a calibrate-sensor function to calibrate the color measuring sensors of the plural different types of color measuring devices;

a move-to-patch function to relatively position the color measuring sensors and a color patch for the plural different types of color measuring devices, the move-to-patch function being provided with a logical color patch number by the application program; and a make-measurement function to make a color measurement of the patch at which the color measuring sensors is relatively positioned, the make-measurement function providing the application program with a color measurement value for the color patch, and wherein for a color measuring device that is being operated, the API provides the application program with flow control data of the number of times that the function must be called.

* * * * *

UNITED STATES PATENT AND TRADEMARK OFFICE

CERTIFICATE OF CORRECTION

PATENT NO. : 6,873,431 B1
DATED : March 29, 2005
INVENTOR(S) : Timothy L. Kohler et al.

It is certified that error appears in the above-identified patent and that said Letters Patent is hereby corrected as shown below:

Column 6,
Line 7, "as well" should read -- as well as --; and
Line 47, "S." should read -- 5. --.

Column 7,
Line 4, "device," should read -- devices, --.

Column 8,
Line 2, "call," should read -- calls, --.

Column 12,
Line 12, "program 4B." should read -- program 48. --.

Column 13,
Line 19, "time" should read -- times --.

Column 15,
Line 19, "functions" should read -- functions. --; and
Line 20, "of" should read -- Of --.

Column 16,
Line 17, "is" should read -- are --.

Column 20,
Line 19, "is" should read -- are --.

Signed and Sealed this

Eighteenth Day of October, 2005

JON W. DUDAS
*Director of the United States Patent and Trademark Office*